United States Patent [19]
Parker

[11] Patent Number: 5,822,520
[45] Date of Patent: Oct. 13, 1998

[54] METHOD AND APPARATUS FOR BUILDING NETWORK TEST PACKETS

[75] Inventor: Steven D. Parker, San Francisco, Calif.

[73] Assignee: Sun Microsystems, Inc., Palo Alto, Calif.

[21] Appl. No.: 578,831

[22] Filed: Dec. 26, 1995

[51] Int. Cl.$^6$ .................................................. G06F 16/00
[52] U.S. Cl. ................... 395/200.6; 395/200.47; 395/200.53; 395/285
[58] Field of Search ............... 395/183.01, 183.15, 395/200.06, 200.11, 200.01, 183.19, 183.14, 200.3, 200.47, 200.53, 200.6, 285; 370/255

[56] References Cited

U.S. PATENT DOCUMENTS

| | | | |
|---|---|---|---|
| 5,285,199 | 2/1994 | Pocek | 340/825.03 |
| 5,410,535 | 4/1995 | Yang et al. | 370/248 |
| 5,418,793 | 5/1995 | Chang et al. | 371/27 |
| 5,446,736 | 8/1995 | Gleeson et al. | 370/85.13 |
| 5,481,735 | 1/1996 | Mortensen et al. | 395/200.1 |
| 5,509,006 | 4/1996 | Wilford et al. | 370/401 |
| 5,530,703 | 6/1996 | Liy et al. | 370/255 |
| 5,710,908 | 1/1998 | Man | 395/500 |

FOREIGN PATENT DOCUMENTS

463764 A2  11/1991  European Pat. Off. .

OTHER PUBLICATIONS

Generic SIgnaling Protocol: Architecture, Model, and Services by Miller et al., IEEE publication pp. 957–966, 1992.

Generic Signaling Protocol: Switching, Networking, and Internetworking by Miller et al., IEEE publication pp. 967–979, 1992.

*Primary Examiner*—William M. Treat
*Assistant Examiner*—Zarni Maung
*Attorney, Agent, or Firm*—Beyer & Weaver, LLP

[57] ABSTRACT

A method, apparatus, and computer program product are provided for generating test packets to be used in developing network protocol devices. According to the method of the invention, a first computer system is provided that includes a packet shell generation facility. The packet generation facility includes a generic command language interface mechanism and a packet management function generator. Using the packet shell generation facility test packets are generated for use in testing various aspects of network protocol devices.

23 Claims, 9 Drawing Sheets

METHOD AND APPARATUS FOR BUILDING NETWORK TEST PACKETS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. The Field of the Invention

The present invention relates to computer networks and to computer network communications protocols. More specifically, the present invention provides methods and apparatus for developing and testing interactively computer network protocol stacks and for creating computer network communications packets having highly arbitrary properties.

2. The Relevant Art

The use of networked computers has virtually exploded in recent years. Computer networks have become very attractive for a number of reasons. First, networked computers facilitate communication between the users of the computers through technologies such as electronic mail (E-mail), and video conferences through local work stations. Second, computer networks have become extremely important for the dissemination and processing of data. Using computer networks, data can be located at individual sites for access and subsequent processing by many remote users. Third, there is growing interest in harnessing the computing power of several networked computers to perform individual computing tasks using technologies such as distributed processing. The use of computer networks through network structures such as the Internet has also facilitated "telecommuting", in which workers perform job tasks remotely using networked computers, which has had a tremendous impact on the workplace environment over the last five to ten years.

The successful networking of computer systems requires the use of protocols or agreements or sets of rules that define structures for communication between computers. For example, in order for two computers to communicate successfully each computer must beware in advance of the length (and time) of a bit, how to recognize the start of data transmission, and how to recover from errors in data transmission, in addition to the language of the transmission. Typically protocols are structured in layers. The lowest layer is typically concerned with the hardware aspects of the communication, handling issues such as the electrical and mechanical aspects of the connection of the computer to the network. Several middle layers handle the organization of data into well defined units such as frames, packets, and messages, and the transmission of those messages from the origin to the destination. The upper layers of the protocol typically handle the meaning of the message that is being forwarded, and include such protocols as file transfer protocols and electronic mail protocols. The employment and design of such protocols, e.g., TCP/IP and ISO OSI, are well known to those of skill in the computer network arts (Ralston 1993).

In order for a message generated on a local computer to travel across the network to one or more destination computers, the message must first traverse each of the above described protocol layers. Each layer comprises an interface which ensures that only those messages having the correct formatting and sequencing are handled by the layer. Messages that lack the correct formatting and/or ordering are thus rejected as being improper. In addition, the protocol has to protect itself from both the user and the network. It is highly undesirable for a user to make changes to the packets of information that are being sent over the network. In addition, the protocol must identify erroneous packets (e.g. damaged or fragmented packets). Thus, the generation of packets is strictly controlled by the protocols. Unfortunately the strict rules adhered to by protocols for the generation of packets makes testing new protocol stacks and communication between protocol layers extremely difficult. This is because there are few if any good methods for generating packets having arbitrary characteristics in order to test the interfaces between the various layers to detect flaws and inconsistencies in the design of either the interface or the particular layer being tested. Also, it is important in the testing and development of protocol stacks to understand how a "good" protocol stack will react to erroneous message packets.

Currently these sorts of tests are performed through the use of special purpose programs that specially create packets or sequences of packets. These specialized programs have to be created individually for each test being performed. Separate packet capture tools are then used to verify the results of the tests. These methods are extremely cumbersome, time consuming, expensive, and difficult to employ. As a result, less testing of new products is performed resulting in increased likelihood of failures. Thus, the creation of new protocols is a relatively inefficient process.

SUMMARY OF THE INVENTION

The present invention alleviates these problems by providing methods and apparatus for the generation and testing of packets having arbitrary characteristics. Using the method and apparatus of the invention packets of arbitrary type and character can be created through a extensible interactive packet language framework through which user-extensible packets can be generated for protocol development and testing. Thus it will be appreciated that the present invention provides a method for quickly and efficiently generating packets with which protocol stacks can be tested thereby facilitating the development of network communications tools.

In one aspect the present invention provides a computer-implemented method for generating test packets for simulating computer network communications. According to one embodiment of the method of the invention, a packet shell generation facility is provided that includes a generic command language interface mechanism and a packet shell function generator. At least one library of protocol-specific commands is also provided and linked to the packet shell function generator. A test packet is then generated using the packet shell generation facility by issuing commands to said generic command language interface to cause said packet shell function generator to create or modify packet data structures in accordance with said protocol specific commands located in said library. In one embodiment the packet shell is then transmitted on the computer system that includes the packet shell generation facility. In another embodiment, the test packet is transmitted to a remote computer system that is coupled with the first computer system.

In still another embodiment of the method of the invention, the test packet is transmitted to at least one network protocol device. The device may be an actual device or it may be a virtual device. In yet another embodiment, at, least one library of protocol-specific commands are provided in addition to the packet shell generation facility. These libraries can be coupled with the packet shell function generator in one embodiment and, more specifically, in another embodiment are linked dynamically to the packet shell function generator.

In another aspect, the present invention provides a computer system for creating test packets for use in testing network protocol devices. The computer system of the invention includes, in one embodiment, a kernel portion and a user portion. In addition, a packet shell generation facility is located in the user portion. The packet shell generation facility includes a generic command language interface mechanism that is coupled with a packet shell function generator. In addition, at least one protocol device is included with the computer system. In one embodiment, the computer system further comprises a computer network that includes at least one remote computer, the computer system of the invention being coupled with the computer network so that the remote computer can communicate with the above-described computer system. In still another embodiment, the packet shell function generator is coupled with at least one library of protocol specific commands.

In yet another embodiment, the present invention includes a computer program product that includes a computer usable medium having computer readable code devices embodied therein for generating test packets for simulating computer network communications. The computer program product provided by the present invention includes computer readable program code devices for providing a packet shell generation facility that includes a generic command language interface mechanism and a packet shell function generator. In one embodiment, the computer program product further includes computer program code devices for transmitting test packets created using the packet shell generation facility over a computer network. In another embodiment the computer program product of the invention includes computer program code devices for providing at least one library of protocol specific commands.

These and other aspects and advantages provided by the present invention will become apparent when the Description below is read in conjunction with the accompanying Drawings.

DESCRIPTION OF SPECIFIC EMBODIMENTS

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, Various general purpose machines may be used with programs written in accordance with the teachings herein, or it may be more convenient to construct a more specialized apparatus to perform the required method steps. The required structure for a variety of these machines will appear from the description given below.

In addition, the present invention further relates to computer readable media which include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

Figure 1:
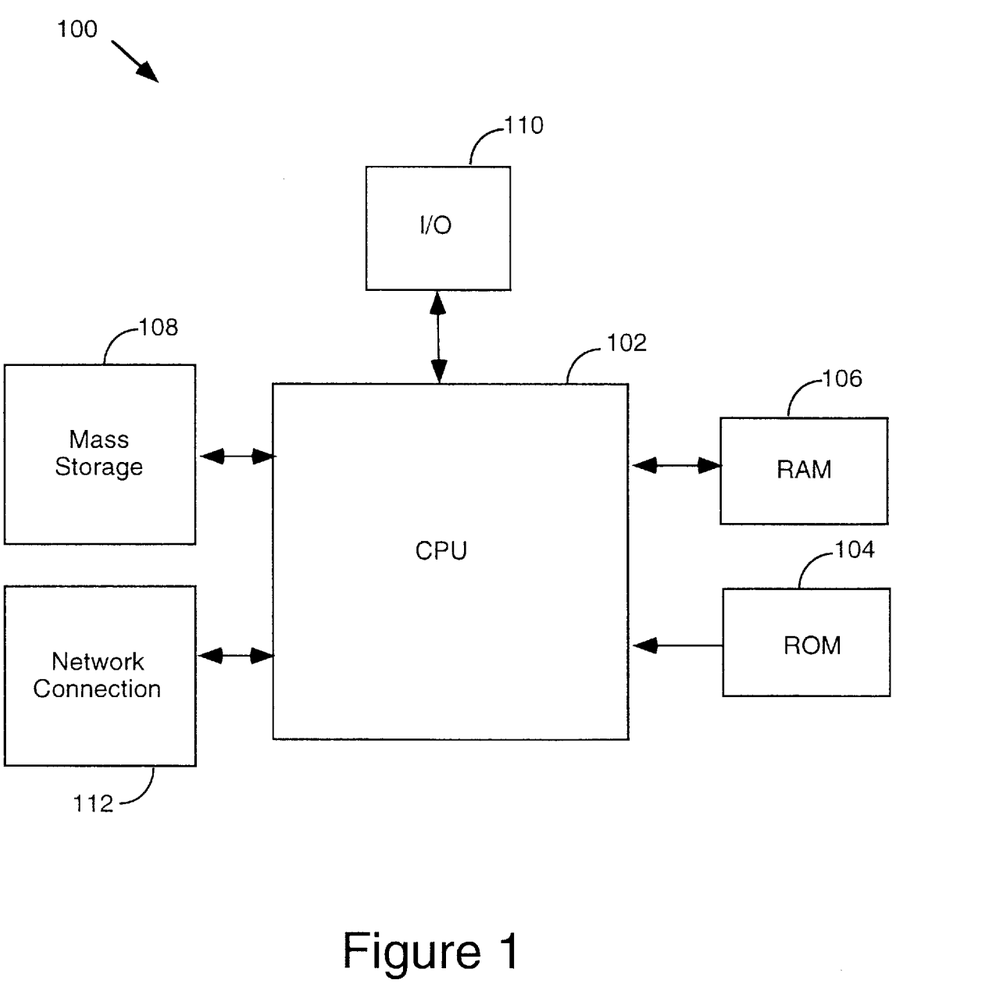
FIG. 1 is a schematic illustration of a computer system in accordance with the present invention.

FIG. 1 at 100 shows a typical computer-based system in accordance with the present invention. Shown is a central processing unit 102 (CPU) which is coupled to memory devices including read only memory 104 (ROM) and random access memory 106 (RAM). As is well known in the art, ROM 104 acts to transfer data and instructions unidirectionally to the CPU and RAM 106 is used typically to transfer data and instructions in a bidirectional manner. A mass memory device 108 is also coupled bidirectionally to CPU 102 and provides additional data storage capacity. The mass memory device 108 may be used to store programs, data and the like and may take the form of a magnetic or paper tape reader or some other well known device (e.g., CD-ROM). It will be appreciated that the information retained within the mass memory device 108, may, in appropriate cases, be incorporated in standard fashion as part of RAM 106 in the form of virtual memory. CPU 102 is also coupled to one or more input/output devices 110 (I/O) which include, but are not limited to, devices such as video monitors, trackballs, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally can be coupled to a computer or telecommunications network using a network connection as shown generally at 112. The above-described devices and materials will be familiar to those of skill in the computer hardware and software arts (Herzog, 1996; Ralston 1993; Stone 1983; Martin 1989).

Figure 2:
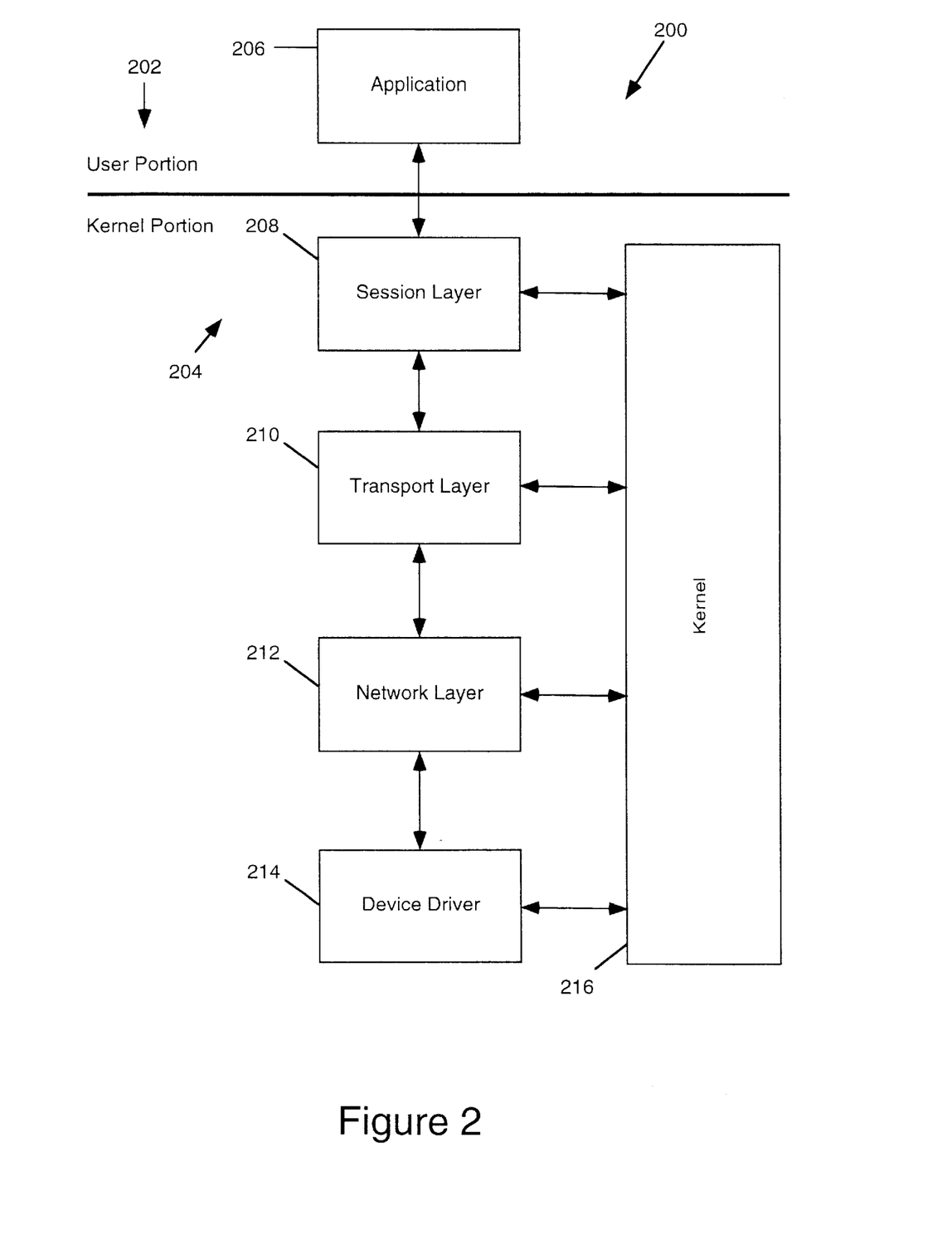
FIG. 2 is an illustration of a layered computer network protocol as commonly implemented in current practice.

FIG. 2 at 200 illustrates a common computer network protocol architecture. In general, the architecture can be separated into two portions: a user portion 202 and a kernel portion 204. The user portion includes an Application 206 through which the user or machine generates the message to be sent across the network to one or more remote sites. Application 206 thus can be any software capable of creating a message for transmission across the computer network, e.g., electronic mail software.

Within kernel portion 204 are a number of layers which collectively format and physically transmit the message across the network. Typically, these layers include a session layer 208, a transport layer 210, a network layer 212, and a device layer (or device driver) 214. Each of these layers is well known to those of skill in the computing arts and is described, for example, in the ISO Standard Network Layering Model. Session layer 208 provides for the creation and destruction of the communication session in addition to information as to how the connection is to be made and error recovery is to be handled (e.g., whether the system is switched to another server in the event a first server is unavailable). Examples of Session layer function include indicating that a message is to be sent over the network and choosing a port to be used for the transmission.

Session layer 208 is in bidirectional communication with Application 206 and with Transport layer 210. In general, Transport layer 210 is responsible for operations such as retransmitting data and flow control (i.e. directing the remote sender to send data in a predetermined number of bytes). Examples of Transport layer functions include parsing data to be transmitted into portions as required by the protocol being used.

Transport layer 210 is in bidirectional communication with network layer 212 which network layer typically is responsible for routing messages to their destination. The Network layer functions typically include putting the address of the message's destination into the header of the message.

Network layer 212 is in bidirectional communication with Device layer 214 which typically provides the hardware interface between the computer system 100 and the network, and is responsible for taking the packet of information, formatting the data in the message in accordance with the requirement of the hardware being used, and transmitting the message physically onto the network. As indicated in the Figure, each of the layers is in bidirectional communication with the kernel 216, or operating system, of the local computer.

As described above, each of the layers shown in FIG. 2 includes an interface which selectively filters the signals, or "packets" that are handled by each layer. As used herein the term "packet" will be taken to mean any collection of information being handled by the network protocol layers. A "packet" can also mean a collection of binary data and control elements (including optional error control information) that are arranged in a specific format and switched and transmitted as a whole (Kurpis 1993). Typically, the interface for each layer is different. The generation of erroneous test packets to test each of the layers, the interfaces of the layers, and the interactions between the layers, is extremely difficult because of the rigid adherence to protocol specifications by packet generation software.

The present invention avoids these problems by providing a unique packet data structure in which data corresponding to each of the protocol layers being simulated is arranged in a serial fashion. In one embodiment, the data blocks are arranged such that the data representing the lower level layers come before the data blocks representing the higher level layers. In addition, each packet further comprises a table, the elements of which indicate the name of the layer and the byte offset in the packet of the data representing that layer. In one embodiment, the name END is provided for the table entry following the table entry for the last layer represented in the data structure.

Figure 3:
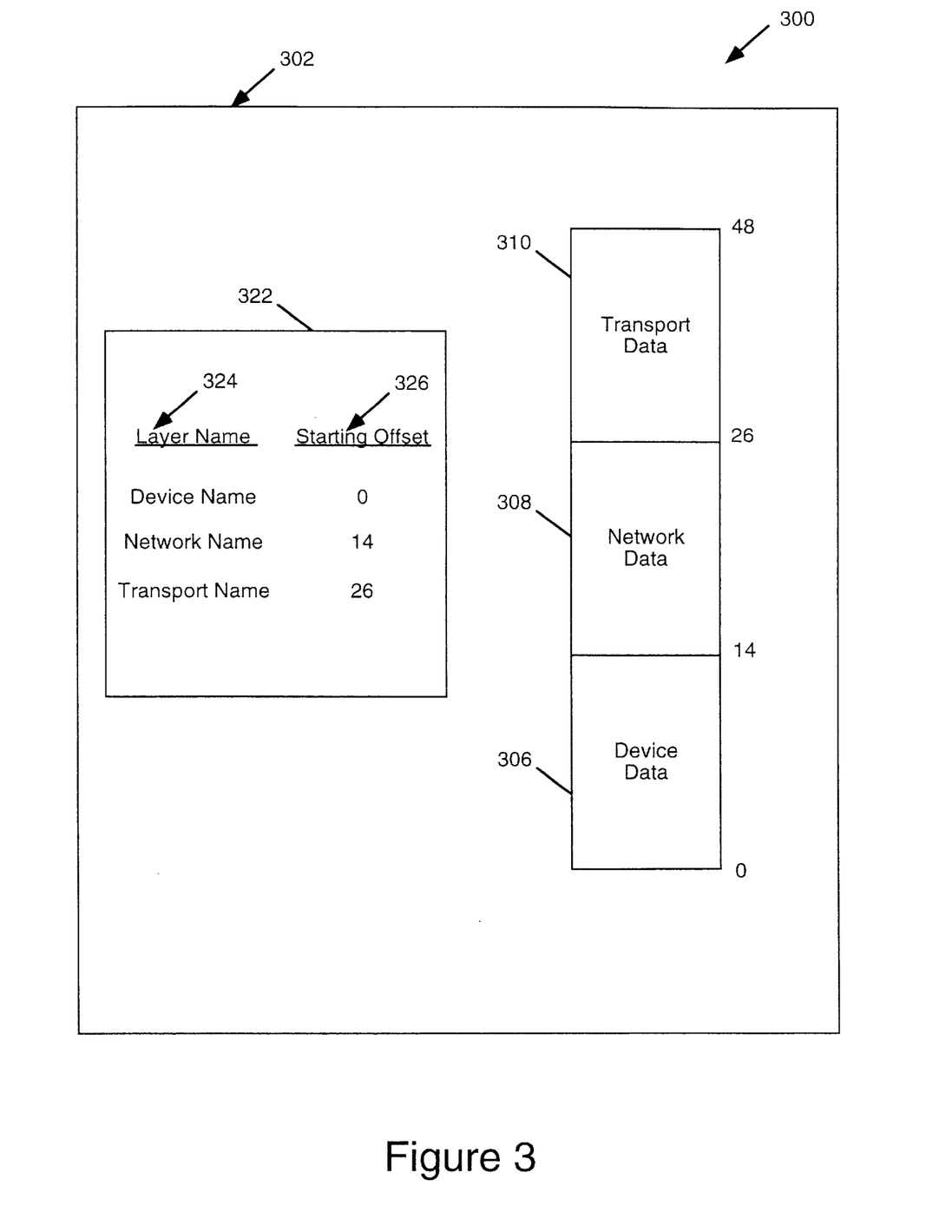
FIG. 3 is an illustration of the data structure of a packet in accordance with one embodiment of the present invention.

One example of this type of packet data structure is shown in FIG. 3 at 300 which illustrates a packet 302 which, includes a packet data structure 304 and a packet table 312. In this embodiment, the arrangement of data in packet data structure 304 is such that the data for the lowest level layer (e.g., device layer 212 of FIG. 2) is the first block 306 of the data structure. This block is followed by a contiguous block of network data 308 which is followed in turn by a third contiguous block of transport data 310. In the illustrated embodiment, the device layer data comprises a contiguous block of data from bits 0 to 14, the network data comprises a contiguous block of information from bits 15 through 26, and the transport data block comprises a contiguous block of data from bits 27 through 48. However, it will be appreciated that the data blocks may vary in size arbitrarily. In addition, the blocks need not occupy contiguous space in the computer's memory, but can comprise disjoint memory segments.

Packet table 312 includes as elements the names of the protocol layer data blocks in addition the offset of each block in memory. If each data block occupies a continuous section of memory no additional information is required to specify the location of the data. However, in embodiments in which one or more blocks occupies disjoint memory segments, the packet table will further include the length of each segment in addition to its offset. The packet table also can comprise disjoint memory segments. The construction and manipulation of such data structures will be familiar to those of skill in the computer science arts.

The data structure described in FIG. 3 provides several important advantages. In particular, the size of each block can be determined implicitly by determining the location of the next element in the table. Such a structure is often a good approximation for most protocols. Also, the identity of each block can be determined readily by calling a function to read the table resident in the header of the packet. In one embodiment, the present invention includes such a function called DECODE( ) which takes as an argument the index of the layer in the header table. Thus, by calling the DECODE( ) function, the location and identity of each device layer represented in the packet can be determined.

It will be appreciated that such a structure avoids the problem commonly known in the computer science arts wherein network protocol layers make assumptions regarding the data structure of incoming packets. For example, network software using the TCP/IP protocol will often assume an IP data block immediately follows a TCP data block and "peek" inside the IP header to obtain necessary information that the IP header contains. Although this programming strategy works adequately in principal, if the packet being processed has been damaged during transmission (e.g., the packet has become fragmented) then the information being obtained from the supposed IP block is not reliable and unpredictable consequences can result. The data structure and DECODE( ) function provided by the present invention thus will be seen to obviate the need to make assumptions about the packet structure and will therefore provide more reliable communication between layers.

Figure 4:
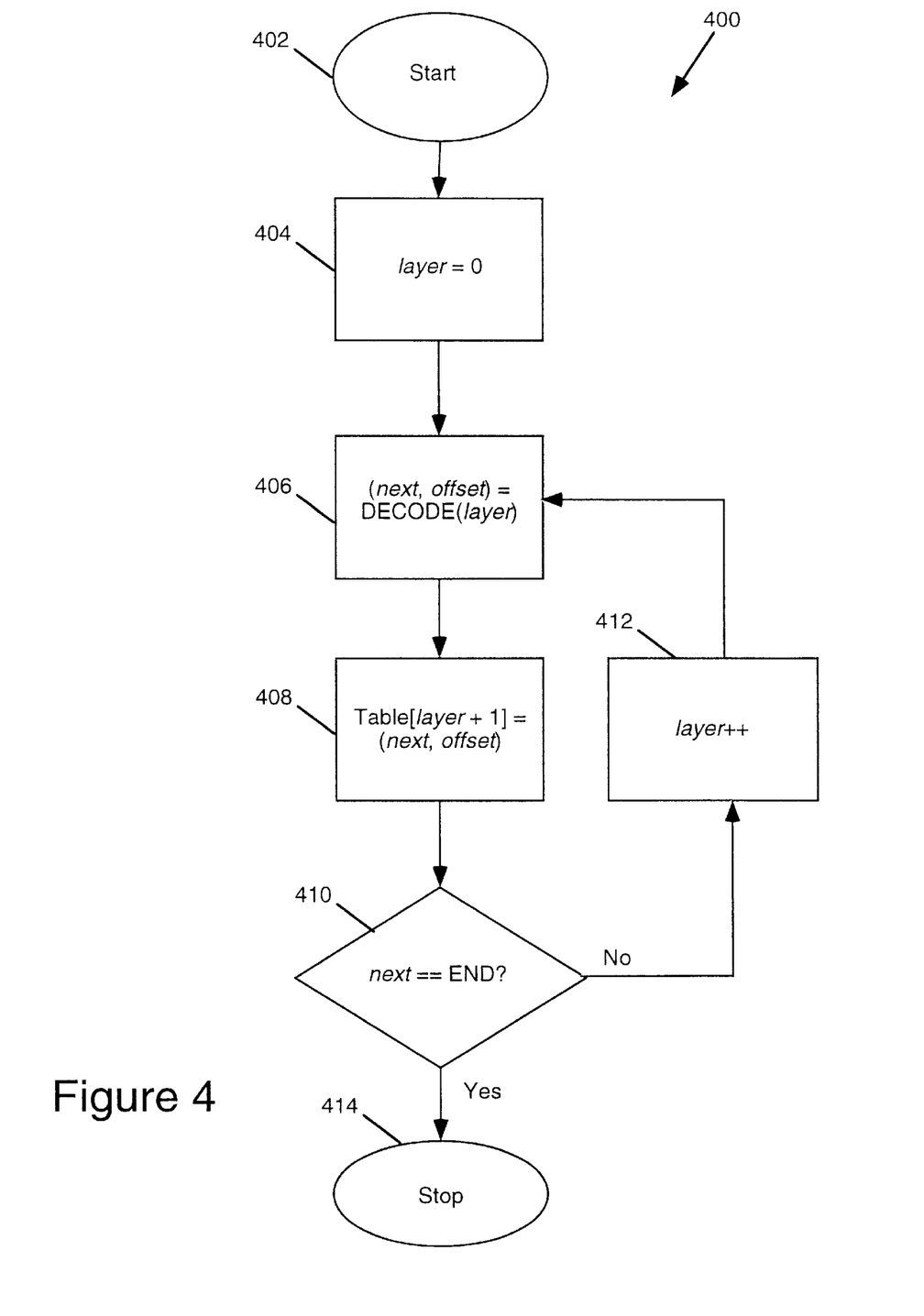
FIG. 4 is a flowchart illustrating a bootstrapping function in accordance with one embodiment of the present invention.

When a packet is created, the packet creator indicates the protocol name of the first layer of the packet. If the packet is subsequently modified so that a change to the order, number, or identities of the layers represented in the data structure might result, then a bootstrapping function is called to update the header of the data packet. The operation of the bootstrapping function is illustrated at 400 in FIG. 4. Beginning at step 402 the variable layer indicating the table index is set to 0 at step 404. Next, at step 406, the variables next and offset are set equal to the function DECODE(layer). At step 408 the value of the header table element Table[layer+1] is set equal to (next, offset). At step 410 a determination is made as to whether the variable next is equal to the value END. If the result of the query at step 410 is negative, then the variable layer is incremented at step 412 and the loop returns to step 406. Otherwise the process ends at step 414.

Figure 5:
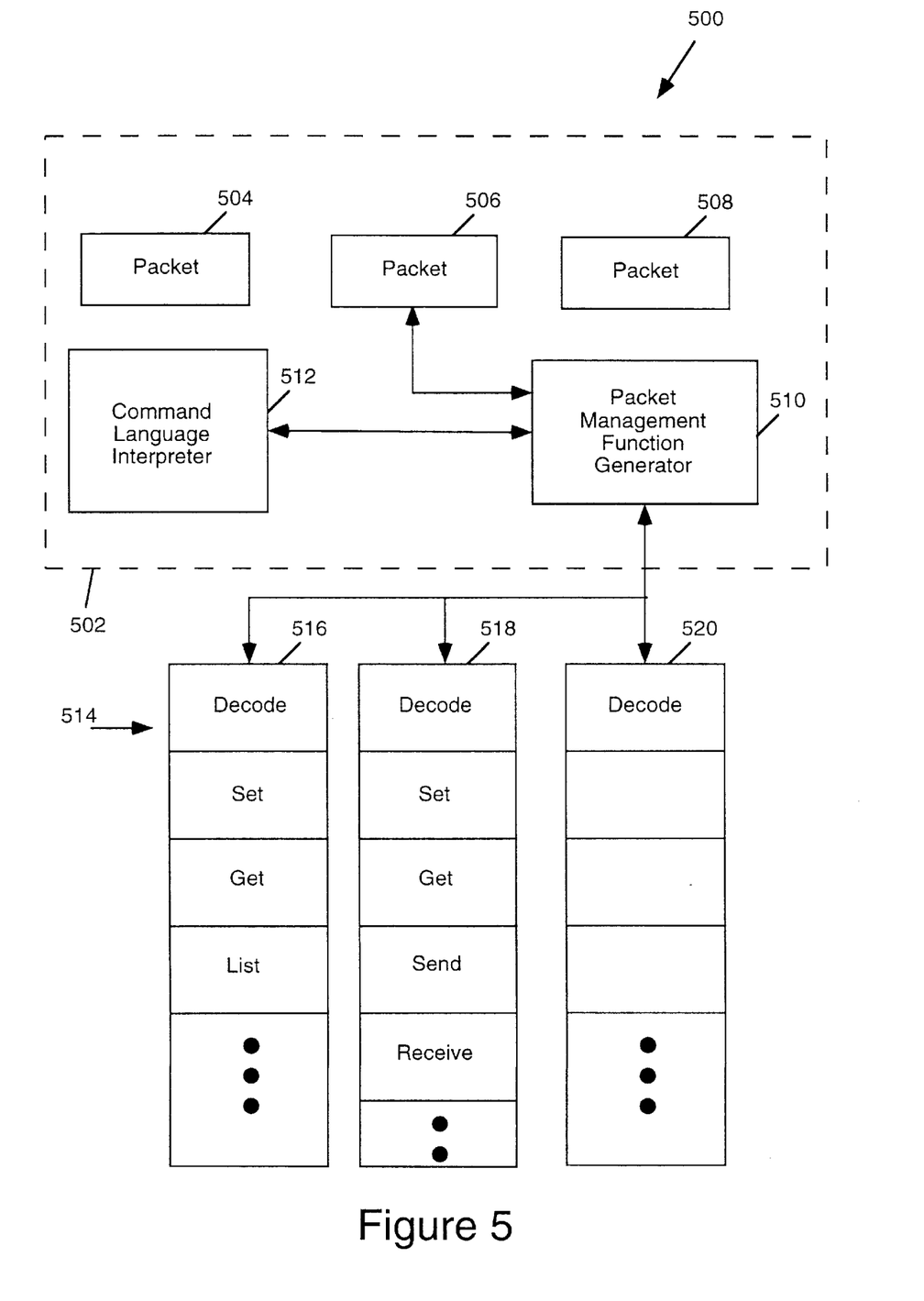
FIG. 5 is an illustration of a packet shell and dynamically linked libraries in accordance with one embodiment of the present invention.

FIG. 5 at 500 illustrates a facility for generating the above-described packets. Shown at 502 is a packet generation shell which comprises various packets 504, 506 and 508 as described above. One or more of the packets are in bidirectional communication with packet management function generator 510 which packet management function generator is in turn in bidirectional communication with generic command language interpreter 512 (see Ralston 1993). In one embodiment, interpreter 512 is a Tool Command Language (TCL) interpreter. According to one embodiment of the invention the TCL interpreter provides an interface for a user to manipulate one or more packets through packet management function generator 510. Packet management function generator 510 includes various packet management functions such as the above-described DECODE( ) function, in addition to other management functions such as an ALLOCATE( ) function for creating packets and a FREE( ) function for releasing memory assigned to packets. The design and construction of the packet management function generator will be familiar to those having skill in the computer science arts.

In another embodiment, packet management function generator 510 is in bidirectional communication with one or more dynamically linked libraries (DLLs) shown generally at 514. The individual DLLs 516, 518 and 520 each comprise the instructions typical for a given protocol. Thus, for example, DLL 516 could include the instructions for the TCP protocol, DLL 518 might include the instructions for the OSI TP4 protocol, and DLL 520 might include the instructions for the IPX protocol. In one embodiment, each of the libraries contains the above-described DECODE( ) function so that if any library is used to modify a packet in such a way as to potentially alter the table describing the data structure of the packet, the table can be appropriately updated using the above-described bootstrap function. In another embodiment, each of the libraries includes primitives to read the header table, copy data from one packet to another, set fields in the table, query a packet for information such as the packet's length, send and receive packets, and SET and GET commands to build packets. These and other primitives will be familiar to those of skill in the computer science arts. An exemplary set is provided in the accompanying document, entitled "Primitive Examples", which document is herein incorporated by reference in its entirety.

FIGS. 6–9 illustrate examples of the employment of the above-described packet shell generation facility to the simulation of various aspects of communication on a computer network, and, in particular, to generate test packets to evaluate the performance of various network protocol layers. These examples are intended for the sole purpose of describing the present invention and should not be considered as limiting the scope of the invention in any way.

Figure 6:
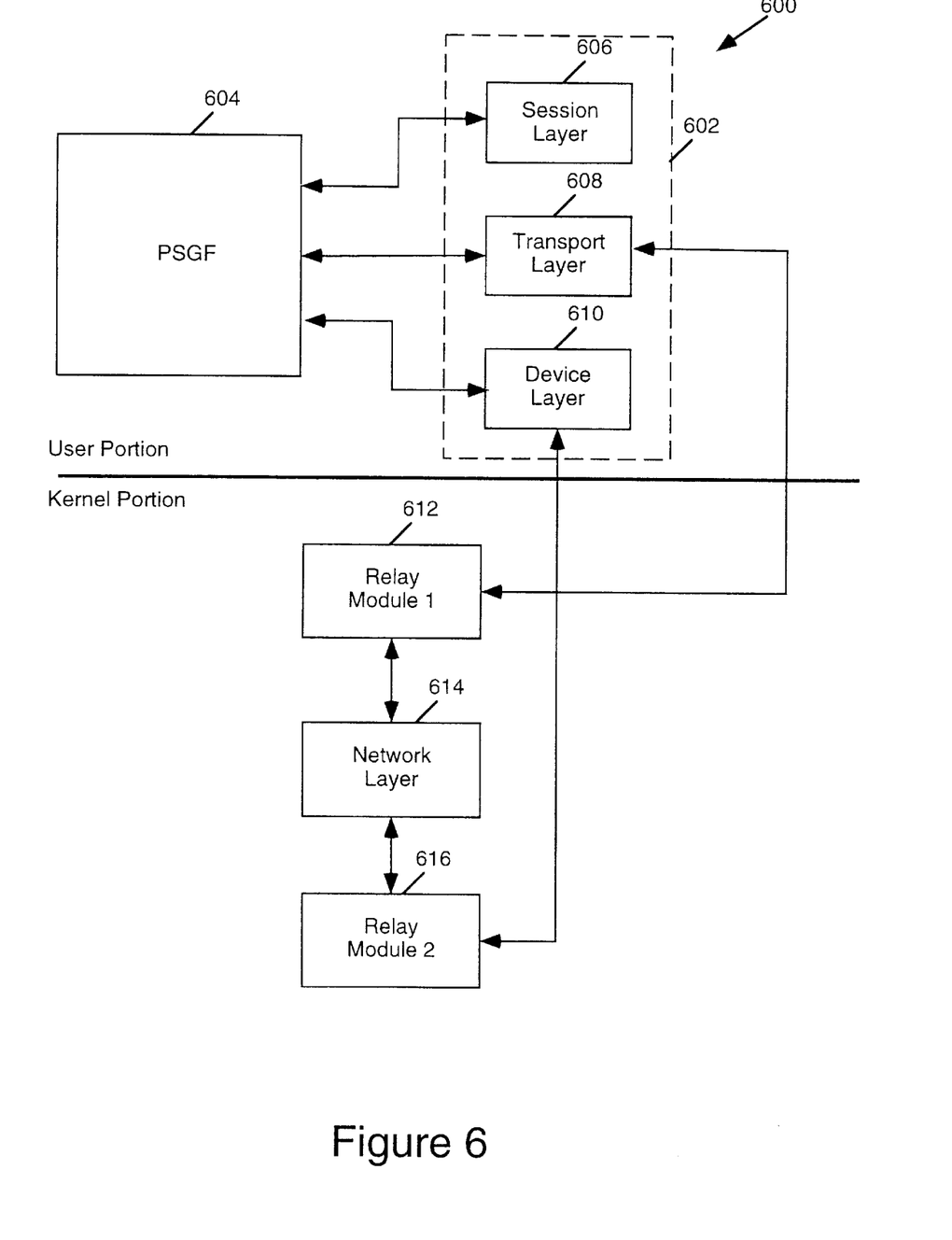
FIG. 6 is an illustration of the employment of the packet shell of the invention to simulate the operation of a network protocol layer.

FIG. 6 at 600 illustrates the use of the packet shell generation facility of the present invention to test an individual network protocol layer. At the user portion of the computer system, i.e., that portion of the computer system comprising the user interface and applications, which includes a packet shell 602. Packet shell 602 comprises various testing modules, or virtual layers, representing the network protocol layers not being tested. In the present example, these layers include a virtual session layer 606, a virtual transport layer 608, and a virtual device layer 610 which simulate the functions of actual network protocol layers as described above. Each of the virtual layers is coupled bidirectionally with packet shell generation facility 604. The virtual layers are created using primitives contained in the protocol-specific libraries. Thus, testing modules can be created corresponding to any desired communications protocol.

The kernel comprises a first relay module 612, the protocol layer being tested 614 (here, the network protocol layer), and a second relay layer 616. Each of the relay layers functions to convey information to and from the layer in the kernel being tested to the appropriate virtual layers in the testing module in the user portion of the computer system. The first relay module is coupled bidirectionally with the virtual layer in the testing module corresponding to the network protocol layer that resides "above" the layer being tested. The second relay module is coupled bidirectionally with the virtual layer corresponding to the network protocol layer that resides "below" the layer being testing. In the present example, since the network protocol layer in being tested, the first relay module in coupled with the transport layer, and the second relay module is coupled bidirectionally with the device layer.

In operation, the virtual layers simulate the passage of a test packet through one or more protocol layers to the layer being tested. The response of the layer being tested to the test packet is returned by the second relay module through the virtual layer "beneath" the layer being tested to the packet shell generation facility. Thus, using the packet shell generation facility packets of arbitrary character and composition can be used to test the response of the layer being tested. The layer under test can be modified as necessary and re-tested without delays arising from the creation of specific testing software to evaluate each revision. Also, the architecture provided by the present invention makes testing of any layer straightforward since the libraries can be used to generate testing modules in a highly efficient manner. Again, the effort of creating individual testing programs is reduced.

Figure 7:
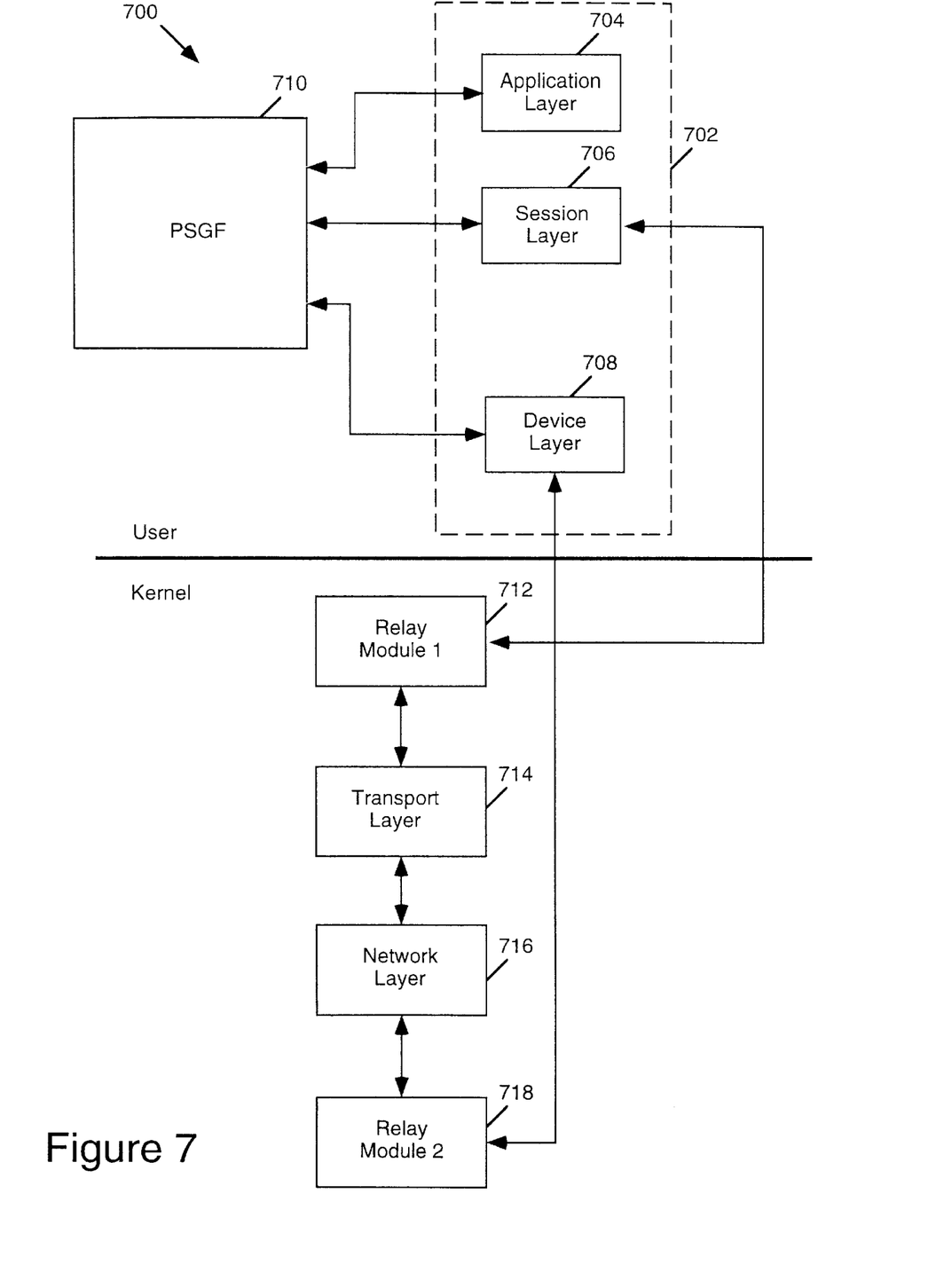
FIG. 7 is an illustration of the employment of the packet shell of the present invention to simulate the testing of multiple protocol layers.

FIG. 7 at 700 illustrates the testing of multiple network protocol layers. In accordance with the testing of a single layer described above, the packet shell generation facility is used to create virtual layers. Thus, as seen in the Figure, packet shell 702 includes a virtual application layer 704, a virtual session layer 706, a virtual transport layer 706, and a virtual device layer 708. Each of these virtual layers is in bidirectional communication with packet shell generation facility 710.

Residing in the kernel are the first relay module 712, transport layer 714, network layer 716, and second relay module 718. As described above, virtual session layer 706 is in bidirectional communication with the first relay module and virtual device layer is 708 is in bidirectional communication with the second relay module. Using the packet shell generating facility, packets are constructed as described above and sent using the first relay module through the transport and network layers. The responses from these layers is then returned to the packet shell generation facility from the virtual device layer via the second relay module. It will be appreciated that such an arrangement allows for testing interactions among various network protocol layers.

Figure 8:
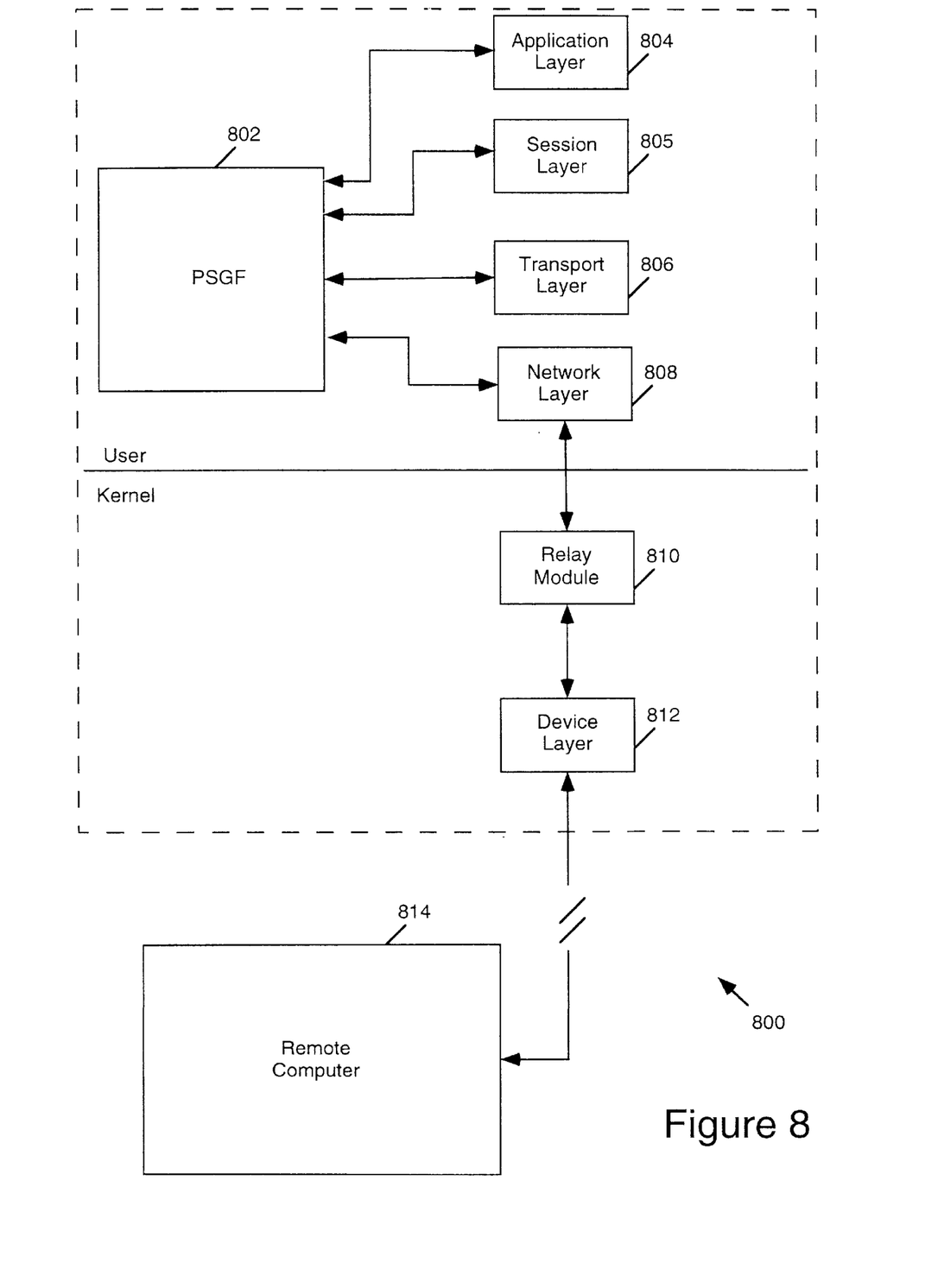
FIG. 8 is an illustration of the employment of the packet shell of the present invention for generating test traffic.

FIG. 8 at 800 illustrates the use of the packet shell generation facility provided by the present invention to generate test traffic over a computer network. In the user portion of the computer system, packet shell generation facility 802 is in bidirectional communication with virtual application layer 804, virtual session layer, virtual transport layer 806, and virtual network layer 808. In the kernel portion of the computer system reside relay module 810 and device driver 812. Device driver 812 is bidirectional communication with one or more remote computers such as shown at 814 over a computer network 816 (e.g., an ethernet network).

In this exemplified embodiment of the present invention, the packet shell generation facility is used to generate test packets using the virtual network protocol layers as described above. These packets are relayed to the device layer via the relay module and sent over the network to the remote computer(s). The progress and effect of the test packets can be monitored and evaluated using standard techniques. In addition to the embodiment shown in FIG. 8, other network protocol layers can be located in the kernel so that only the effects of specific network layers can be evaluated.

Figure 9:
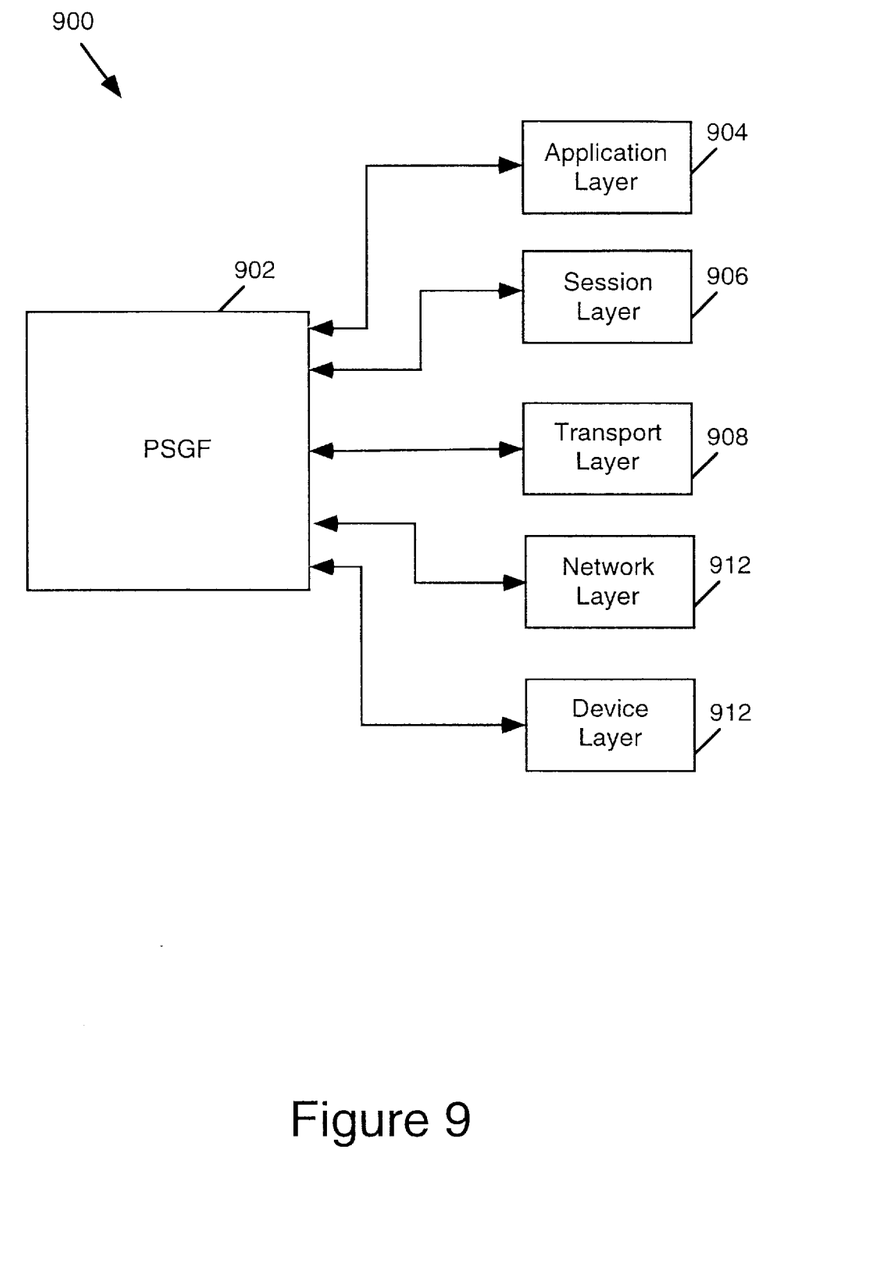
FIG. 9 is an illustration of the employment of the packet shell of the present invention for simulating a computer network.

FIG. 9 at 900 is an illustration of a virtual network, useful, e.g., simulating the interactions among all layers of a network protocol. In this exemplary application of the present invention, packet shell generating facility 902 is in bidirectional communication with virtual application layer 904, virtual session layer 906, virtual transport layer 908, virtual network layer 910, and virtual device layer 912.

In one embodiment, the packet shell generation facility is capable of being coded to simulate the kernel framework using, for example, the "Streams" framework which can be used to simulate the Solaris® operating system kernel (available from Sun Microsystems of Mountain View, Calif.). An example of one set of Streams commands is provided in document, entitled "Stream Command Examples", which document is herein incorporated by reference in its entirety. In one embodiment, the packet shell generation facility is used to simulate only the interfaces between network protocol layers in addition to the interfaces between the kernel and the network protocol layers to simulate and monitor thereby the network traffic between layers. It will be appreciated that real code and simulation can be combined to any degree providing an wide range of simulation and testing capabilities.

Although the foregoing invention has been described in some detail for purposes of clarity of understanding, it will be apparent that certain changes and modifications may be practiced within the scope of the appended claims.

The following materials are incorporated herein by reference in their entirety and for all purposes.

1. Ralston, Anthony, and Reilly, Edwin D. 1993. *Encyclopedia of Computer Science*. Van Norstrand Reinhold.
2. Herzog, James H. 1996. *Design and Organization of Computing Structures*. Franklin, Beedle & Associates, Inc.
3. Stone, Harold S. 1983. *Microcomputer Interfacing*. Addison Wesley.
4. Martin, James, and Chapman, Kathleen K. 1989. *Local Area Networks: Architectures and Implementations*. Prentice Hall.
5. Kurpis, Gediminas P., and Booth, Christopher J. 1993. *The New IEEE Standard Dictionary of Electrical and Electronics Terms*. Institute of Electrical and Electronics Engineers, Inc.
6. Accompanying document, *Primitive Examples*.
7. Accompanying document, *Stream Command Examples*.

Primitive Examples

/* Q(#)Language 1.5 */
Version 2 of the packet shell . . .
The language consists of primitives in three classes: per-protocol, protocol layer operations, and miscellaneous.
Identifiers used:
ID: A unique text string to identify a connection end-point.
PROTO: The name of a supported "protocol" PRLAYER: The protocol and/or layer indication which identifies the component of a packet to be operated on. This string has one of the forms:
PROTO
PROTO:INDEX
INDEX
Where index is a non-negative integer. The first form will work only if only one occurrence of the indicated protocol exists within the packet. If two instances of a protocol are layered within a packet a zero-based index is used. For example:
ip :1
Refers to the second IP layer in a packet, perhaps in an ICMP packet which encloses a second IP header. 'ip:0' refers to the first IP layer in such a packet.
If only an index is given, then whatever protocol is found at that layer is operated on.
Note that PROTO may be the string 'end' which indicates the current end of packet marker. It can be used to indicate "append to the end of this packet". PROTO may also be the string 'all', which means the entire packet buffer is to be selected, if appropriate for the operation specified.

TIMEOUT: The parameter passed to a poll system call indicating whether to wait indefinitely, for a limited period of time, or only if the operation can be done now.

OP: Protocol end-point operation. The list of valid operations is a
  function of the protocol layer. For example, an IP end-pont might
  have the operations 'send' and 'recv' to send and receive IP packets.

Per-Protocol Operations
popen PROTO ID [proto-specific arguments]
Open a communications end-point named by the string ID, communicating with the "base" protocol PROTO. Any additional arguments are determined by the protocol itself. For example, popen le0 ethernet /dev/le 0 0×800
might specify open the ethernet protocol, on /dev/le, attach to unit 0, SAP 0×800.
pclose PROTO ID [proto-specific arguments]
Close a communications end-point. Mainly this command releases resources, closes files, etc. associated with the end-point.
ID.OP [proto-specific arguments]
Invoke the protocol defined operation on the end-point identified by ID. The protocol-specific arguments are passed to the function provided by the protocol to implement the operation.
pinit PROTO PNAME [proto-specific arguments]
Create a packet, specifying PROTO as the "lowest level" protocol to be used. The protocol indicated supplies a packet buffer of a length expected to be "convenient". Additional optional arguments are made available to that protocol's pinit routine.
pfree PNAME [proto-specific arguments]
Free any resources, etc. associated with this packet variable. Mainly frees up the memory associated with the packet.
pset PNAME PRLAYER proto-specific arguments
Set a protocol element in the packet named by PNAME. PRLAYER specifies the protocol layer to be set. The format of the rest of the options are determined by the protocol itself.
pget PNAME PRLAYER protospecific arguments
Get a protocol element in the packet named by PNAME. It works similar to pset, but returns a string rather than sets a value.
plist PNAME [PLAYER]
List a summary of packet PNAME, the component indicated by PLAYER. If PLAYER is omitted, return a 'plist' operation for each layer in turn, one per line.
Protocol Layer Operations
To help understand these commands, the packet shell keeps a table which decodes the current state of each packet buffer. It consists of: (protocol name, offset) and is terminated by the special entry: ("end", offset)
which marks the end of a packet. (Which may be short of the buffer the packet is actually stored in.) It is convenient to be able to query this table for a packet. The commands below provide this information to the user.
pcopy PNAME '/' PRLAYER PNAME1 '/' PRLAYER1 [PNAME2 '/' PRLAYER2]*
Copy into the packet PNAME beginning at layer PLAYER from packet PNAME1 layers PRLAYER1, and so on, for each packet name/ layer specifier indicated. For example suppose packet 'ippckt' contains an IP packet, and packet 'icmp' contains an IP header, and an ICMP packet. An IP header from ippckt can be appended to icmp with:
pcopy icmp/end ippckt/ip
poffset PNAME PRLAYER Return the offset field, for packet PNAME, of the layer indicated by PLAYER. 'poffset PNAME end' returns the current length of the packet.
pproto PNAME PRLAYER
Return the protocol name for packet PNAME, indicated by PRLAYER. Note that this is most commonly expected to be used in forms like:
proto PNAME 0
to return the protocol name of the first layer of the packet.
plen PNAME PRLAYER [<length>]
Return the length of the protocol layer PRLAYER in the packet PNAME. If a value is present, then the length of that segment of the packet is changed to the indicated size, in bytes.
pcast PNAME PRLAYER PROTO
Modify the indicated PRLAYER to be interpreted as protocol "PROTO". This is a way to type cast a packet to be interpreted a specific way. For example, if you have a DLPI protocol, you can use this to force the payload of DLPI primitives to be interpreted as ethernet or FDDI. ptbl PNAME
Dump the current packet table contents, showing the name and offset of all protocol layers imbedded in the packet.
Miscellaneous
passert EXPR TEXT
For test writers: Evaluate the expression. If it isn't true, report on stderr the text TEXT, and stop execution of the current script.
pread PNAME TYPE [PRLAYER:]OFFSET [LEN]
Raw packet read. Emits the hex representation of the indicated portion(s) of the named packet. If present, PRLAYER indicates that the offset should be interpreted relative to that protocol layer in the packet. If LEN is present, the indicated number of elements is dumped. TYPE can be 'b', 'w' or 'l' for 8, 16, or 32 bit quantities respectively.
pwrite PNAME TYPE [PRLAYER:]OFFSET VALUE [VALUE . . . ]
The opposite of pread in that pwrite modifies the indicated bits of the packet.

Stream Command Examples
Streams Reference Manual
popen streams <ep-name> /kernel/strmod/ldterm
Open a streams end-point from the indicated module to <ep-name>.
ldl.strop open [outpkt]→"stopped kmem_zalloc Oxbc sleep"
  Events Return
  status {stopped,finished}
  stop cause {allocb, canput, canputnext, bcanput, bcanputnext, bufcall, copyb, dupb, copymsg, dupmsg, delay, esballoc, freeb, freemsg, kmem_alloc, kmem_ zalloc, kmem_free, pullupmsg, putnext, exit, qwait, qwait_sig}
cause specific arguments
Outpkt, if present, is the packet buffer into which the resulting treams message is written, if any is issued. If outpkt is not present, and a message is written it is discarded.
ldl.cont [wakeup] <integer> [outpkt]
Continue the event currently stopped on that stream. If the optional string "wakeup" is present, then resume the sleeping thread, if qwait_sig, kmem_alloc(KM_SLEEP), etc. pushed aside an event thread. The integer values is interpreted as true or false by the event handler which is being resumed, and used to indicate whether the request should succeed or fail, if this is meaningful.
ldl.strop wput inpkt [outpkt]

ldl.strop rput inpkt [outpkt]
ldl.strop wsrv [outpkt]
ldl.strop rsrv [outpkt]
ldl.strop bufcall <id> [outpkt]
ldl.strop close [outpkt]
IPv4 Reference Manual
ip.a2h <address>
Take numeric form of address and return the host name for that address. Numeric values are in host byte order.
ip.h2a <hostname>
Translate hostname into numeric IP address. Returns it as a integer in host byte order.
ip.src <ip-address>
Take the hostname, dotted quad, or host byte order integer form of an IP address, and set that IP address as the default source address when packets are initialized.
ip.dst <ip-address>
As ip.src, but sets the destination address.
popen ip <ep-name> <path>
Opens the network interface corresponding to <path>, and attaches it to end point named <ep-name>.
pclose ip <ep-name>
Close the indicated end-point.
pinit ip <pkt>
Initialize a new packet buffer named <pckt>. The initialization sets the IP header length to 5, the version to 5, type of service to 0, the id field to a monotonically increasing value, offset to zero, time-to-live to 40, protocol to TCP(6), and the source and destination addresses to zero. If a different value is supplied with ip.src or ip.dst, that value is used instead of zero.
pfree <pkt>
Free the indicated packet buffer.
pget <pkt> ip dst
pget <pkt> ip src
pget <pkt> ip proto
pget <pkt> ip len
pget <pkt> ip sum
pget <pkt> ip hlv
pget <pkt> ip tos
pget <pkt> ip id
pget <pkt> ip off
pget <pkt> ip ttl
Fetch the indicated fields from the indicated packet.
pset <pkt> ip dst <host>
pset <pkt> ip src <host>
pset <pkt> ip proto <protocol>
pset <pkt> ip len <length>
pset <pkt> ip sum <sum>
pset <pkt> ip hlv <integer>
pset <pkt> ip tos <integer>
pset <pkt> ip id <integer>
pset <pkt> ip off <integer>
pset <pkt> ip ttl <integer>
Set the indicated fields in the indicated packet.
<ep-name>.send <pkt>
Send the indicated IP packet through the indicated end-point name.
<ep-name>.recv <pkt>
Receive a packet through the indicated end-point.
IPv6 Reference Manual
ip6.a2h <address>
Convert the given IPv6 address to a hostname.
ip6.h2a <hostname>
Convert the hostname to an IPv6 address.
ip6.src <hostnameladdress>
Set the default source address to be used when packets are pinitted.
ip6.dst <hostnameladdress>
Set the default destination address to be used when packets are pinitted.
popen ip6 <ep-name> <path-to-interface>
Open the indicated interface, and attach it to the IPv6 end-point name indicated.
pclose ip6 <ep-name>
Close the indicated IPv6 end-point.
pinit ip6 <pktname>
Create a default IPv6 header as the indicated packet.
pfree ip6 <pktname>
Free the indicated packet.
pget <pkt> ip6 dst
pget <pkt> ip6 src
pget <pkt> ip6 proto
pget <pkt> ip6 len
pget <pkt> ip6 v
pget <pkt> ip6 flow
pget <pkt> ip6 ttl
Return the indicated field from the IPv6 packet.
pget <pkt> ip6 dst <address>
pget <pkt> ip6 src <address>
pget <pkt> ip6 proto <protocol>
pget <pkt> ip6 len <value>
pget <pkt> ip6 v <value>
pget <pkt> ip6 flow <value>
pget <pkt> ip6 ttl <value>
Set the indicated field.
plist <pkt> ip6
List the packet.
<ep-name>.send <pkt>
<ep-name>.recv <pkt>
Send or receive the indicated packet.
ICMP for IPv6
pinit icmp6 <pkt>
Create a icmp6 packet variable.
pfree icmp6 <pkt>
Free the indicated packet.
pget <pkt> icmp6 type
pget <pkt> icmp6 code
pget <pkt> icmp6 cksum
pget <pkt> icmp6 wordl
pget <pkt> icmp6 target
pget <pkt> icmp6 target-ether
pget <pkt> icmp6 source-ether
Return the indicated fields from an ICMPv6 packet. Note that target-ether refers to the link layer destination address option.
The source-ether refers to the link layer source address option. Target refers to the IPv6 target address. Both '-ether' fields apply to router/neighbor solicitation packets.
The code currently supports only having one option, and the icmp6 must be resized by hand to make room for the option.
Wordl refers to the "icmp_void" member in the icmp structure—the first full word after the type/code word.
7
pset <pkt> icmp6 type <type-nameltype-value>
pset <pkt> icmp6 code <integer>
pset <pkt> icmp6 cksum <integer>
pset <pkt> icmp6 cksum
pset <pkt> icmp6 wordl <integer>
pset <pkt> icmp6 target <IPv6-address>
pset <pkt> icmp6 target-ether <ether-address>
pset <pkt> icmp6 source-ether <ether-address>
Set the indicated fields in an ICMPv6 packet. Type-name can be any of the strings:

unreachable
packet too big
time exceeded
parameter problem
echo request
echo reply
group query
group report
group term
router solicitation
router advertisement
neighbor solicitation
neighbor advertisement At this time no string values are accepted for the code field. Note that the psetting the cksum without an argument causes the correct checksum to be computed and placed in the cksum field of the packet.

The target-ether and source-ether refer to options to neighbor discovery ICMP6 messages. The code currently supports only having one option, and the icmp6 must be resized by hand to make room for the option. (Use plen for this.) Wordl refers to the "icmp_void" member in the icmp structure—the first full word after the type/code word.

plist <pkt> icmp6

Summarize an ICMPv6 packet.

Ethernet Protocol

Access to the ethernet is provided by the 'ether' protocol.

popen ether <end-point> <device-path> [<filter>]

Open a DLPI ethernet device found at <device-path> and attach it to the indicated communications end-point. If the optional <filter> is present, it is a snoop-syntax filter expression which limits which packets are seen by the "recv" primitive for this end-point. Normally all packets are seen.

pclose ether <end-point>

Close a previously popented ethernet end-point.

ether.src <ether-address>

Set the default source ethernet address for packets.

ether.dst <ether-address>

Set the default destination ethernet address for packets.

pinit ether <pkt>

Initialize an ethernet packet variable. The source and destination ether addresses are initialized at creation to the default values. Those values must be set with ether.src and ether.dst commands.

pget <pkt> ether src
pget <pkt> ether dst
pget <pkt> ether type Return the indicated fields in the ethernet header.
pset <pkt> ether src <ether-address>
pset <pkt> ether dst <ether-address>
pset <pkt> ether type <ether-type>

Set the ethernet field as indicated. The symbolic names "ip", "arp", and "ipv6" are recognized for the ether-type field, or it can be specified by an integer.

<end-point>.send <pkt>

Send the ethernet packet indicated.

<end-point>.recv <pkt>

Receive the next packet from the end-point indicated.

What is claimed is:

1. A computer program product comprising a computer usable medium having computer readable code devices embodied therein for generating test packets for simulating computer network communications, the computer program product comprising computer readable program code devices for providing a packet shell generation facility, including computer readable program code devices for providing a generic command language interface mechanism and a packet management function generator, the packet shell generation facility being network protocol independent.

2. The computer program product of claim 1, further including computer program code devices for transmitting test packets created using said packet shell generation facility over a computer network.

3. The computer program product of claim 2, further including computer readable program code devices for at least one library of protocol-specific commands.

4. The computer readable program product of claim 3, wherein said library further includes program code devices for linking said library dynamically to said packet management function generator.

5. A computer readable medium storing code devices executable for generating test packets for simulating computer network communications, the code devices including a packet shell generation facility that is operable with a plurality of network protocols, the packet shell generation facility comprising:

a generic command language interface mechanism that can interpret a plurality of different inputs, each of the plurality of different inputs being either generic to more than one network protocol or specific to one network protocol; and a packet function generator that generates a test packet for a particular network protocol based on the inputs from the generic command language interpreter, wherein the packet function generator is operable to generate test packets for more than one network protocol.

6. A computer-implemented method for generating test packets for simulating computer network communications, the computer-implemented method comprising the steps of:

a) providing a packet shell generation facility that is protocol independent, the packet shell generation facility including a generic command language interface mechanism and a packet management function generator, and wherein the packet shell generation facility is operable with a plurality of network protocols;

b) providing at least one library of protocol-specific commands;

c) linking said packet management function generator to said library of protocol specific commands for at least one network protocol; and d) generating a test packet using said packet shell generation facility by issuing commands to said generic command language interface to cause said packet management function generator to create packet data structures in accordance with said protocol specific commands located in said library.

7. The method of claim 6, wherein said test packet is transmitted on a computer system upon which resides said packet shell generation facility.

8. The method of claim 6, wherein said test packet is transmitted to a remote computer system that is coupled with a first computer system upon which resides the packet shell generation facility.

9. The method of claim 6, wherein said test packet is transmitted to at least one network protocol device.

10. The method of claim 9, wherein said network protocol device is an actual device.

11. The method of claim 9, wherein said network protocol device is a virtual device.

12. The method of claim 6, wherein said library is linked dynamically to said packet management function generator.

13. The method of claim 6, including the step of modifying said test packet.

14. The method of claim 6, including the steps of creating a table in the test packet that references the data structures in the test packet and processing said data packet to update the status of said table.

15. The method of claim 14, wherein said test packet is created by modification of a previously generated test packet.

16. A computer-implemented method for testing a protocol layer for coupling a first computer system to at least one remote computer system over a computer network, the computer-implemented method comprising the steps of:
   a) providing a packet shell generation facility that is protocol independent the packet shell generation facility including a generic command language interface mechanism and a packet management function generator, said packet management function generator being operable with a plurality of network protocols;
   b) providing a at least one library of protocol-specific commands;
   c) linking said packet management function generator to said library of protocol specific commands for at least one network protocol; and
   d) generating a test packet using said packet shell generation facility by issuing commands to said generic command language interface to cause said packet management function generator to create or modify packet data structures in accordance with said protocol specific commands located in said library; and
   e) transmitting said test packet to said protocol device to be tested.

17. A computer system for creating test packets for use in testing network protocol devices, the computer system comprising:
   a) a kernel portion;
   b) a user portion;
   c) a packet shell generation facility located in said user portion, said packet shell generator including a generic command language interface mechanism coupled with a packet management function generator, wherein the packet management function generator is protocol independent; and
   d) at least one protocol device.

18. The computer system of claim 17, further comprising a computer network including at least one remote computer, and a network connection coupled with said computer system such that said computer system is capable of communicating with said remote computer.

19. The computer system of claim 17, wherein said packet management function generator is coupled with at least one library of protocol-specific commands.

20. The computer system of claim 19, wherein said library is linked dynamically to said packet function generator.

21. The computer system of claim 20, wherein said protocol device is located within said kernel and coupled therewith.

22. The computer system of claim 21, wherein said protocol device is a virtual device and is located in said user portion.

23. The computer system of claim 17, further including a test packet comprising at least one data segment representing a protocol device and a table including the identity and length of each data segment in said test packet.

* * * * *